US012073416B2

(12) United States Patent
Barlin (10) Patent No.: US 12,073,416 B2
(45) Date of Patent: Aug. 27, 2024

(54) METHOD USING ARTIFICIAL NEURAL NETWORKS TO FIND A UNIQUE HARMONIZED SYSTEM CODE FROM GIVEN TEXTS AND SYSTEM FOR IMPLEMENTING THE SAME

(71) Applicant: Solmaz Gumruk Musavirligi A.S., Istanbul (TR)

(72) Inventor: Asim Barlin, Istanbul (TR)

(73) Assignee: Solmaz Gumruk Musavirligi A.S., Sisli/Istanbul (TR)

( * ) Notice: Subject to any disclaimer, the term of this patent is extended or adjusted under 35 U.S.C. 154(b) by 838 days.

(21) Appl. No.: 17/257,536

(22) PCT Filed: Jul. 4, 2018

(86) PCT No.: PCT/TR2018/050344
§ 371 (c)(1),
(2) Date: Dec. 31, 2020

(87) PCT Pub. No.: WO2020/009670
PCT Pub. Date: Jan. 9, 2020

(65) Prior Publication Data
US 2021/0312470 A1    Oct. 7, 2021

(51) Int. Cl.
*G06Q 30/018*    (2023.01)
*G06F 16/33*    (2019.01)
(Continued)

(52) U.S. Cl.
CPC ....... *G06Q 30/018* (2013.01); *G06F 16/3347* (2019.01); *G06F 40/205* (2020.01);
(Continued)

(58) Field of Classification Search
CPC .... G06Q 30/018; G06Q 10/087; G06Q 50/26; G06Q 10/00; G06F 16/3347; G06F 40/205; G06F 40/284; G06N 3/08
See application file for complete search history.

(56) References Cited

U.S. PATENT DOCUMENTS 8,443,389 B2    5/2013  Ali et al.
2001/0013047 A1*  8/2001  Marques ............ G06F 16/9535
                                                        707/999.005
(Continued)

FOREIGN PATENT DOCUMENTS

CN    106537290 A    3/2017
EP    2 704 066 A1    3/2014
(Continued)

OTHER PUBLICATIONS

International Search Report, dated June 12, 2019, pp. 1-4, issued in PCT/TR2018/050344, European Patent Office, Rijiswijk, The Netherlands.
(Continued)

*Primary Examiner* — John T Repsher, III
(74) *Attorney, Agent, or Firm* — Crowell & Moring LLP (57) ABSTRACT

The system disclosed generally concerns a method for allocating specific/unique numbers for any suggested item according to, but not limited to, the Harmonized System (HS), which is the internationally valid generalized commodity nomenclature standards, and a system implementing said method for designating said specific/unique numbers to a suggested item or merchandise that is, a machine-learning oriented approach capable of handling given texts in a conceptual manner to produce accurate and precise prediction(s).

8 Claims, 6 Drawing Sheets

(51) Int. Cl.
  *G06F 40/205* (2020.01)
  *G06F 40/284* (2020.01)
  *G06N 3/08* (2023.01)
  *G06Q 10/087* (2023.01)
  *G06Q 50/26* (2024.01)

(52) U.S. Cl.
  CPC ............ *G06F 40/284* (2020.01); *G06N 3/08* (2013.01); *G06Q 10/087* (2013.01); *G06Q 50/26* (2013.01)

(56) References Cited

U.S. PATENT DOCUMENTS

| | | | |
|---|---|---|---|
| 2005/0222883 | A1 | 10/2005 | Goldberg et al. |
| 2013/0325770 | A1* | 12/2013 | Heidasch ............... G06N 3/042 706/20 |
| 2014/0324814 | A1* | 10/2014 | Kraft ................ G06F 16/24575 707/707 |
| 2015/0161728 | A1 | 6/2015 | Song |
| 2016/0275446 | A1 | 9/2016 | Song |
| 2017/0091320 | A1* | 3/2017 | Psota .................. G06F 16/3337 |
| 2020/0151591 | A1* | 5/2020 | Li ............................ G06N 3/08 |

FOREIGN PATENT DOCUMENTS

| | | |
|---|---|---|
| JP | 2018-513507 A | 5/2018 |
| KR | 10-1571041 | 6/2015 |
| WO | WO 2016/057000 A1 | 4/2016 |
| WO | WO-2016057000 A1 * | 4/2016 ........... G06F 16/285 |

OTHER PUBLICATIONS

International Preliminary Report on Patentability, dated October 15, 2020, pp. 1-9, issued in PCT/TR2018/050344, European Patent Office, Munich, Germany.

* cited by examiner

METHOD USING ARTIFICIAL NEURAL NETWORKS TO FIND A UNIQUE HARMONIZED SYSTEM CODE FROM GIVEN TEXTS AND SYSTEM FOR IMPLEMENTING THE SAME

CROSS REFERENCE TO RELATED APPLICATIONS

This application is a 371 nationalization of PCT/TR2018/050344 filed Jul. 4, 2018, which is incorporated by reference in its entirety.

TECHNICAL FIELD

The system disclosed hereby generally concerns a method for allocating specific/unique numbers for any suggested item according to an established group of standards such as the Harmonized System (HS) which is the internationally valid generalized commodity nomenclature standard, and a system implementing said method for designating said specific/unique identification numbers to any suggested item or merchandise.

PRIOR ART/BACKGROUND

The Harmonized Commodity Description and Coding System generally referred to as "Harmonized System" or simply "HS" is a multipurpose international product nomenclature developed by the World Customs Organization (WCO). During import and export processes, procurement bodies act accordingly with said system for differing tariff schemes for virtually every country and region, therefore seeking methods for accurate and precise calculation and allocation of customs tariff numbers of any merchandise, item or commodity are of paramount importance. A considerable amount of susceptibility to human error is present in the technique at this stage, magnitude of data processing load stemming from the great body of commodity groups (approx. 5000) having been arranged in a logical and legal structure notwithstanding.

SUMMARY

To address these concerns examples of the system described herein weighs on a supervised learning-based method in means of technical rigor; i.e. a decision mechanism based on a neural network having been trained with data of five clusters that is capable of confident conceptual classification.

Regarding the prior art, the document denoted with the publication number KR 101571041 (B1) discloses a system for harmonized system (HS) classification of merchandise with an interface processing unit to select an interface for input reception; a database having HS code correspondence information; and an HS code determination unit. Said disclosure is subject to a set of systemwise rules and constraints such as inclusion/exclusion, and requires explicit user input. US 2016275446 (A1) discloses an apparatus and a method for determining HS code, receiving selectable determination factors from a user and ascertains similarity through comparison with memory storage.

WO 2016057000 (A1), identified as one of the publications in the present technical field, defines a method of learning-oriented classification stating ad hoc and learning rules subsequently employed in order to increase the overall power of handling for a wide array of goods. Other prior art documents such as EP 2704066 (A1) relates to classification of transactions based upon analysis of multiple variables which is deemed to facilitate identification and categorization of an item. US 20050222883 (A1) discloses a general system and method for brokerage operations support that follows steps including receiving information pertaining to the shipment rates of a specific country and is characterized by an architecture encompassing a server and different workstations, attended and unattended alike.

Primary feature of the present system is to provide a method and a system for allocating customs tariff numbers according to Harmonized System (HS) to item and merchandise that is characterized by a processing unit specialized for an artificial neural network-based supervised learning application trained with 5 clusters of conceptualized categories, in turn posing a strong and more accurate, as well as more precise alternative when regarded next to the prior art.

In the proposed system, an item classification and unique identifier allocation scheme is implemented that centers mainly around artificial neural networks, a supervised learning algorithm; however user intervention and need for explicit input are minimized while reducing errors and improving integrity. A processing unit works in harmony with a database and an input means for an item subject to trade to be verified in customs, as opposed to the standard method of manual inspection generally taking precedence. Machine learning method as the main part of the disclosed system is inspired by and modeled after aforementioned standard method of manual inspection carried out by actual human beings, inconclusiveness of which leads to a binding report which takes time to issue and process. In this respect, machine learning methods that utilize full text search in a case with sparse pattern visibility and extent of parameters such as this, as a drawback, develop models that give outputs with a rather large amount of error. To address this, a conceptually defined set of parameters are outlined in an arborescent manner, which is used to increase training rigor through establishment of dedicated training sets for each specific level and steps thereinafter.

This system possesses a series of processing events which, collinear with learning applications, enables the problem of item classification and allocation to be handled in a conceptual manner: Any rank or possible state an item may assume are divided into smaller parts, the logic behind which is to reduce indeterminacies and errors that may arise from the apparent magnitude of the dataset in its entirety, which pertains to technical properties and specifications regarding virtually any of the components of the item in question. This means a mass of data that may appear uncorrelated and unable to be rendered so, ab initio. As it will be elaborated in the following sections, a number to be allocated to a certain goods can be divided to four pairs and a quartet which, when respectively brought together constitute the category, chapter, position, subposition and finally the number in full. This fivefold structure is maintained in the artificial neural network structure, every one of which contains input, hidden and output layers in themselves.

Initially, a query is formed as a result of a series of preprocessing steps. Text is made all lowercase and parsed, subsequently converted to all UTF8 characters, after which they are broken down to syllables and reorganized in the form of phonemes and morphemes, and later into word groups of two and three. Next, the vector conversion of a combination of all said phonemes, morphemes and word groups takes place, which is subsequently normalized. Following step is the training of the artificial neural network, which is combined with an output layer function in order to minimize the error and reduce over/underfitting, once which is achieved the model is saved as a file on the local disk.

General methods of number allocation lead to the gradual modeling of the number suggestion/prediction structure: Models to be trained according to HS-based data are designed according to previously mentioned grouping of numbers resulting in the creation of different divisions of training. Consequently, the output of category suggestion neural network is fed to the chapter suggestion/prediction neural network, the output of which is, in turn, fed to position suggestion/prediction neural network and so on. Final set of suggestions/predictions are then generated and displayed on screen to a human user.

BRIEF DESCRIPTION OF THE FIGURES

Accompanying drawings are given solely for the purpose of exemplifying a unique identification number allocation method and system for implementing said method, whose advantages over prior art were outlined above and will be explained in brief hereinafter.

The drawings are not meant to delimit the scope of protection nor should they be referred to alone in an effort to interpret the scope without recourse to the technical disclosure.

DETAILED DESCRIPTION

Disclosed is a method and a system implementing the same method for automatically allocating and outputting a unique number to a trade item or merchandise based on a query formed. Artificial Neural Networks are used as the key element of the method in order to enable enhanced flexibility to an otherwise strict and convoluted process, as well as a reduced error for a broadly more straightforward approach. A unique number to be ascribed to an item in question may have different components in numeric format, with different groups of which carry information pertaining to a different aspect or feature of said item. Such a process has numerous factors to be considered and many properties as well as constraints to be scrutinized; making it laborious and time-consuming. For this; disclosed method and system comprise features of data processing significantly arranged to utilize machine learning concepts on processing mechanisms handling a wide array of information, replacing actual human beings executing the tasks aforementioned. Different items pose different properties and use areas which become matters of consideration when assigning unique identifiers to them, often requiring voluminous look-up tables (LUTs) and incidentally laboratory inspections. The disclosed system addresses these issues all the while proposing a systematic and programmatic number/identifier allocation scheme that makes use of the conceptual classification property applicable to systems and problems in question.

Strength of the technique present in the system rests on the premise that, said conceptual classification of nomenclature procedure serves to model the solution generate reliable and precise output: In areas where numerous items need to be classified and identified, said system and method is able to allocate and output identification numbers to items/merchandise with a time/accuracy tradeoff advantage not possible to be undertaken by real human beings such as officials and inspectors. Technical specifications of non-generic items may vary greatly, also have seen a surge in categories in recent decades, leading to the expertise load having been rendered cumbersome, costliness regarding time notwithstanding. In different embodiments, legal liabilities also are taken into account with legal precedents being considered, all made possible with the optional connectivity with ERP alongside web and FTP (File Transfer Protocol). With web services utilizable, it becomes possible to synergize information available on multiple platforms, among them legislation and item databases, optionally pertaining to cases and lists in different countries/states as well.

Methods and systems disclosed accept two indirect and one direct input types: Direct input is the manual text entry, which relates to the verbal definition of an item/merchandise in the desired language; whereas indirect inputs refer to catalogue(s) and technical specifications used in the assessment of said item/merchandise externally. Direct input arrives raw, therefore needs to be processed prior to be used for text search and training purposes according to a custom guideline. Once text search is concluded and output is obtained, legislation and item databases begin to deliver according to the furthering of assessment procedures. Legislations database may include, in multiple languages, informations referring to the country/state, relevant fiscal info such as tax and funds, legislation pertaining to liabilities and sanctions, if present, and comparative legal status between two countries/states or similar items/merchandise of the user's choice.

Figure 2:
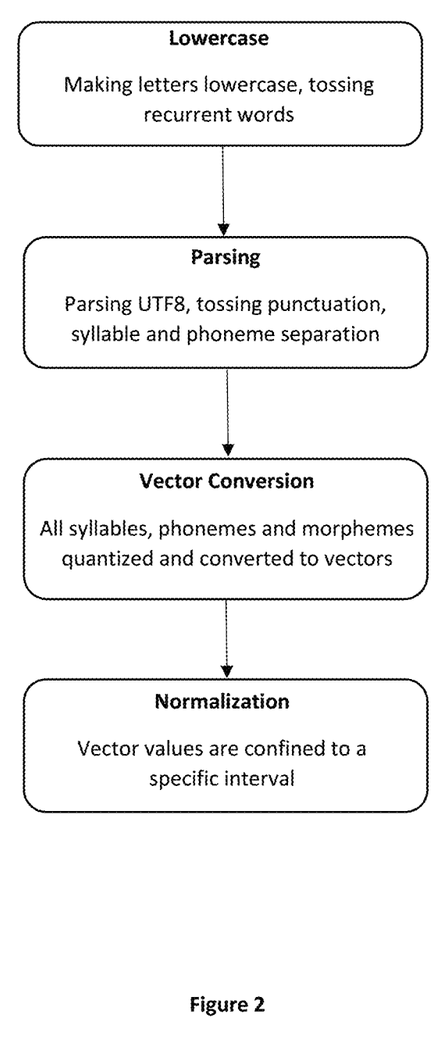
FIG. 2 demonstrates the preprocessing steps executed before the training phase.

As mentioned earlier, manual text entry is raw and contains possibly extraneous, useless or confusing excerpts of information. To bypass this and produce data in the form of numerical vectors suitable for classification purposes, a series of steps are executed under the case of preprocessing. When a text of any length arrives, lowercase step commences during which text is converted to full lowercase letters, along with the deletion of recurrent words for simplicity and size reduction. Following lowercase, parsing is executed where every word in the text is separated, converted to UTF-8 format, punctuation and non-characters are tossed following which words are deconstructed into syllables and morphemes. Final aspect of parsing sees word arrangements in pairs and trios, which could also be referred as tokenization generation or construction. Vector conversion, or vectorization is the step where all, tokenized and untokenized alike, instances of data incident or constructed in previous steps, such as morphemes, word groups, tokens, tentative pairs are quantized numerically, next to which vectors are formed including said numerical representations according to the formula below, where x represents vector value of the word, c the character in the word, h1 and h2 two different experimental constants, j the character index in the word and k number of characters in the word:

$$x_i = h_1, x_i = (c_j \oplus x_i) \times h_2, j=1,2,\ldots,k$$

Normalization, the final step of preprocessing, makes the set of vectors to be confined to a smaller interval since a word may include various ASCII characters, resulting in an impractical, therefore undesired level of variance. This is done according to the formula given below, where x represents word vector, y the text vector series, and j indicating the word count in the series:

$$y_i = x_i \times (1 \div \Sigma_j 1)$$

Figure 5:
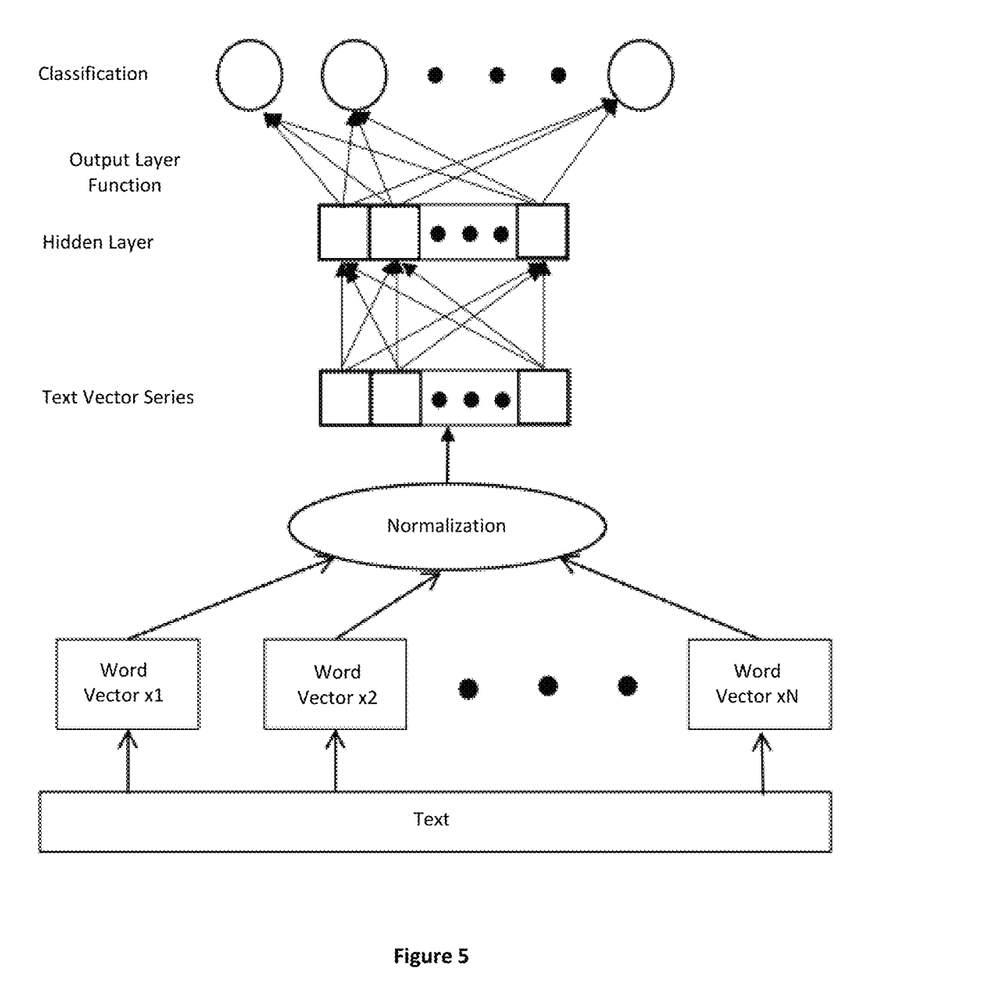
FIG. 5 demonstrates the significant preprocessing steps and training processes of artificial neural networks on every level.

Hidden layer is essentially an m by n matrix, and refers to a training pool where all text entries are associated with related labels. Once a text is preprocessed and a vector is produced, said vector is multiplied by said hidden layer matrix, thus incorporated into the neural network, details thereof are laid bare below where y corresponds to a vector of size n, B to the hidden layer matrix, b to the elements of said matrix B, and z the output vector of size m:

$$z = \begin{pmatrix} z_1 \\ \vdots \\ z_m \end{pmatrix} = \begin{bmatrix} b_{1,1} & \cdots & b_{1,n} \\ \vdots & \ddots & \vdots \\ b_{m,1} & \cdots & b_{m,n} \end{bmatrix} \begin{pmatrix} y_1 \\ \vdots \\ y_n \end{pmatrix} = B \cdot y$$

Output layer function delivers suggestion result to the final state of the output layer, which is utilized for both training and classification instances. The function, where z represents suggestion result, i the index of the suggested label, and j the total number of labels is given below:

$$S(z_i) = \exp(z_i) \div \Sigma_j \exp(z_j)$$

Artificial neural networks in the system are designed to include fully-connected hidden layer(s) and an outer layer. Next to the final output layer, a cost function exists with the purpose of minimizing error after training over a definite number of epochs. C is the cost of said function, where lr is the learning rate, l the actual value of the label and $z_i$ the suggested value in the function outlined below which tradeoff between desired error and cost of training:

$$C_i = lr \times (l - z_i)$$

Figure 1:
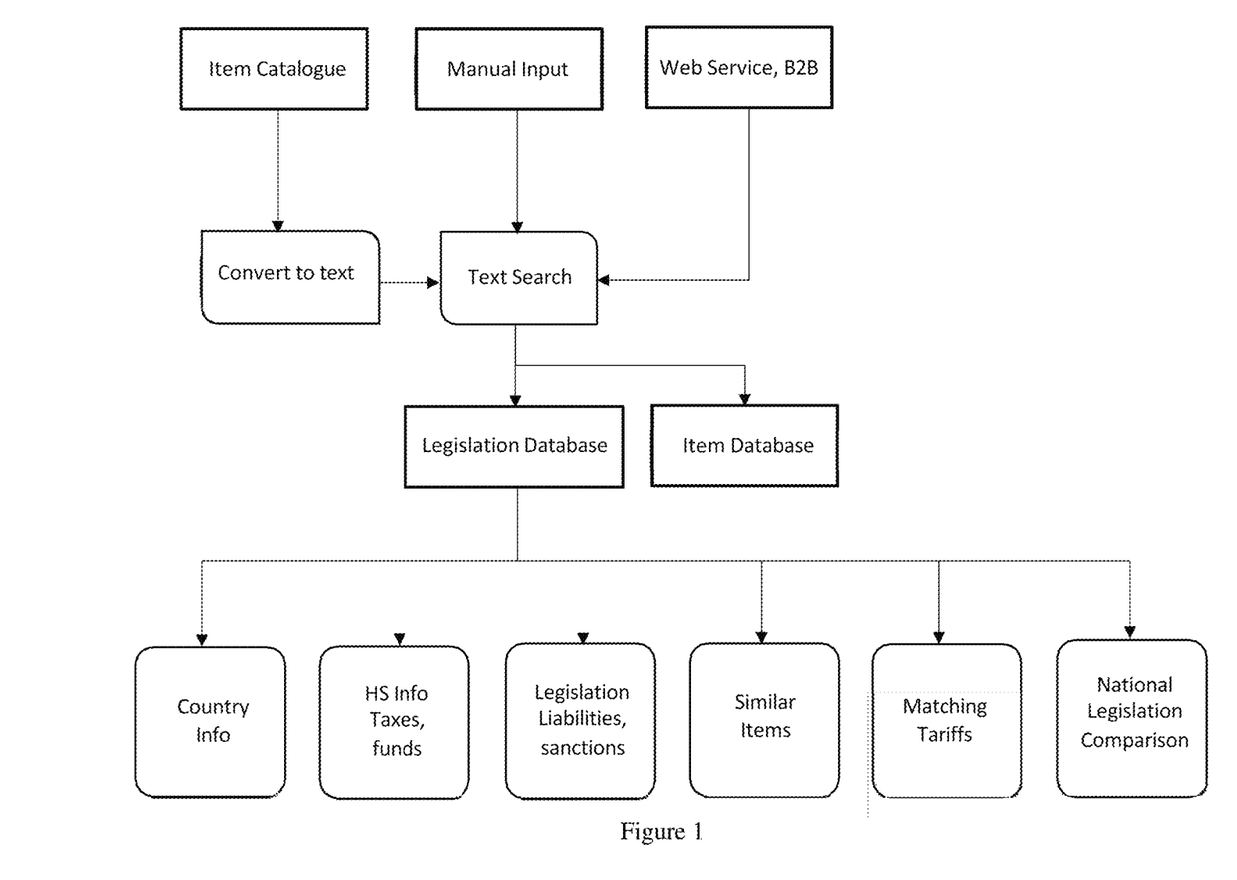
FIG. 1 demonstrates a possible relationship diagram concerning the customs number allocation method.

Since the problem in question includes the modelling according to the classification/ascription behavior of actual human beings inspecting any item/merchandise, distinct parts should present themselves as levels of inspection so that they can be envisioned to constitute steps to be taken during a regular inspection. Such is possible via dividing protocol numbers into smaller, yet still significant parts and therefore making the solution attain gradual, progressive quality. Harmonized System (HS) protocol, for instance, posits a 12-digit code universally valid, which assumes the format XXXX.XX.xx.xx.XX which, by default offers a template for sub-division thereof. Most significant digits are the leftmost six, to be predicted in groups of two, and the remainder of the code is to be producted as a complete whole in the final stage of classification; including the categories which prove particularly advantageous during initial sorting of an item.

Figure 3:
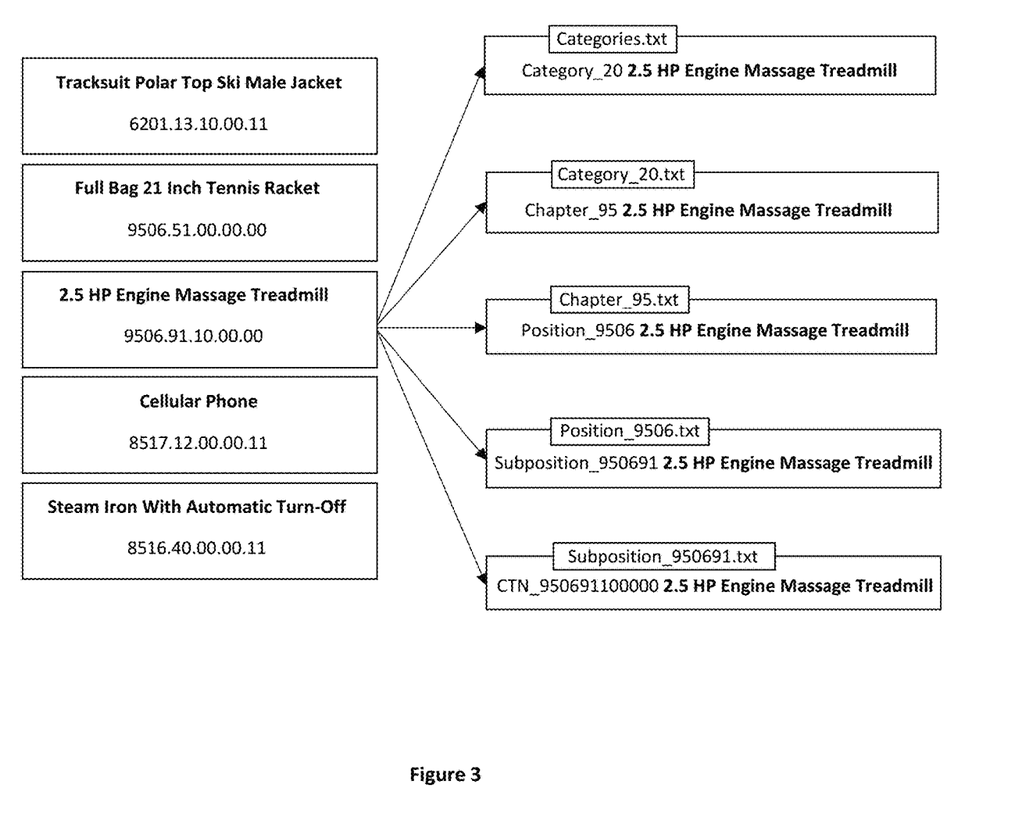
FIG. 3 demonstrates the file hierarchy of the training sets concerning the artificial neural network for hypothetical items.

The disclosed system differs from other full text search and machine learning methods in the sense that it categorizes the classification of subject matter into conceptual constituents, therefore mimicking the implicit decision mechanism taking place in real time significantly better: Same data are processed in batches of five, marginalizing the error at every level via ensuring quadruple error rate dissolution between thereof, as opposed to the amount of epochs needed for training to bring error rate down to a desired level. In doing so, indirect conceptualization of data is assured, akin to that of an actual human being compartmentalizing said unique identification number into smaller parts to progressively inspect said item/merchandise. Based on the Harmonized System (HS), one model for 21 categories, 21 models for 98 chapters, 98 models for 1239 positions, 1239 models for 5407 subpositions and finally a total of 5407 models for full extent of the unique identification number are formed for the training of respective artificial neural networks with fully-connected hidden layers. Arborescent, categorical hierarchy is ensured between every level of artificial neural networks, first four of which pertain to most significant successive pairs of digits respectively; which combines with the legislation database and regional info, accessible and utilizable according to at least one embodiment.

Figure 4:
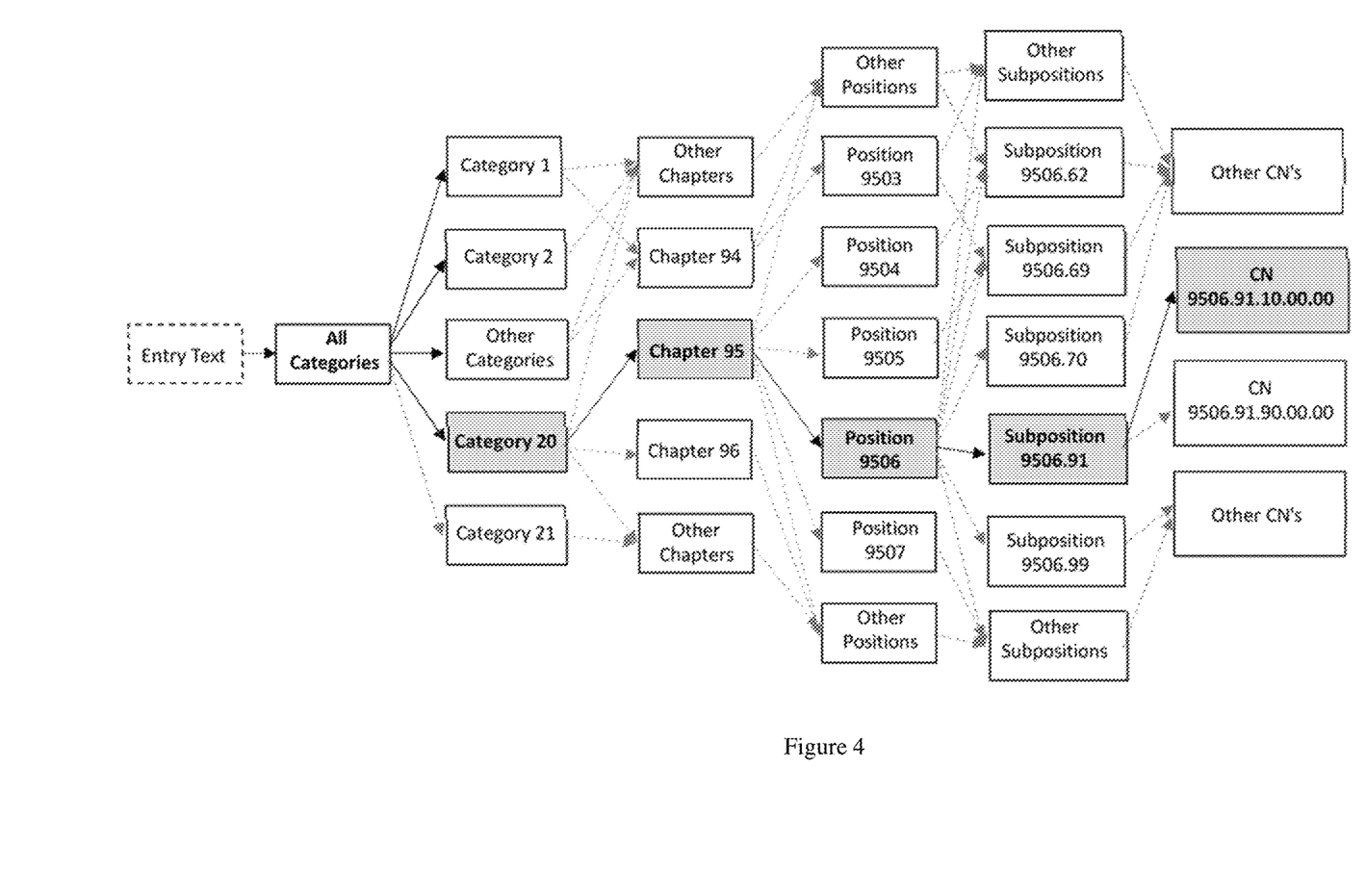
FIG. 4 demonstrates an exemplary diagram for showing a purported flow of information regarding different artificial neural networks when suggesting a number to an item.
Figure 6:
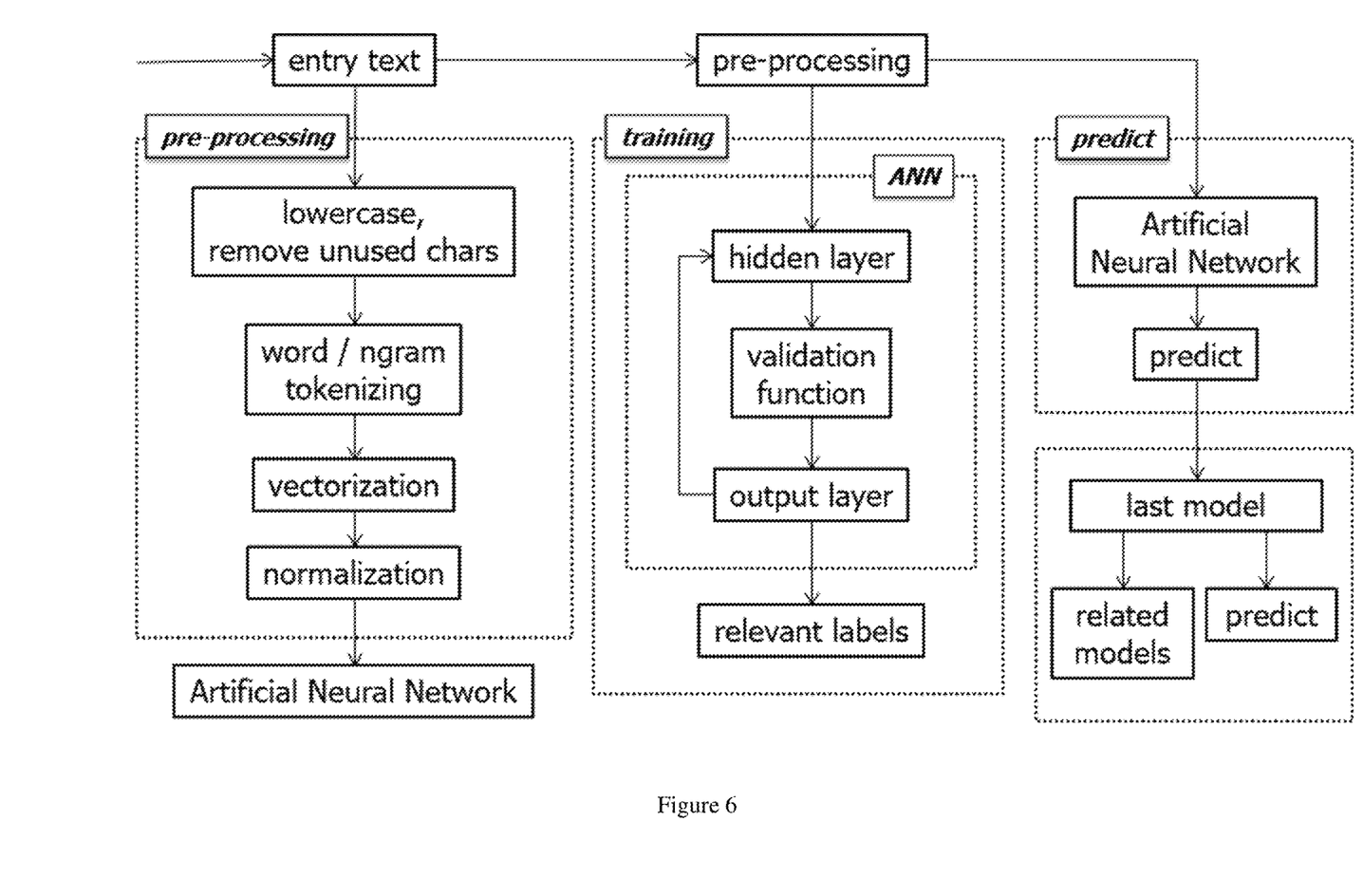
FIG. 6 demonstrates the entire artificial intelligence model that includes preprocessing, training and prediction/suggestion as a whole.

Post-training, system initially executes at level one, during which a category for the item/merchandise is suggested. Suggested category is then prepared as the input of the next level, which is level two, output of which yields a suggestion for chapter and delivered to serve as input to the next level, level 3, and so on. Once all the levels execute their suggestions, the end outcome is presented in a form such that it may include close, overlapping instances of unique identification numbers, in cooperation with the other modules of the system such as legislation database and parallel item/merchandise lists, according to at least one embodiment. In this, it is legitimate to reflect that this system and method do not strictly confine the operation to the exact classifying behavior of an actual human being, i.e. determining the category, chapter, position and subposition in order; in alternative embodiments may it be the case that alternative cross-correlations are also taken advantage of. However, it is to be noted that actual human beings are equipped with a reduced need for categories, and on occasion may even directly suggest unique identification numbers, an approach not only unadvisable but also impossible given the architecture of the system.

In different embodiments, usage of said method and system are facilitated further via integration of various other components such as a legislation database, and item database, a "similar items" module, all of which serve to extend the practical grasp of the disclosed system. One embodiment is, for instance, capable of requesting alternative suggestions based on legislation and item databases of different states at will. Another embodiment is capable of retrieving matching tariffs, used for comparatively suggesting a unique identification scheme for the end user to consider. These features/modules are not mutually exclusive, as one embodiment comprises all of which simultaneously, coordination of which with ERP systems are ensured yet still.

In a nutshell, the disclosed system proposes a method of allocating unique identification numbers, such as ones enforced through the Harmonized System (HS), to items and merchandise of any nature or area of use, with the aid of an artificial neural network chain capable of implicitly conceptualizing data within categories, chapters, positions and subpositions through dedicated neural networks trained for the suggestion of which; comprising modules and processing units undertaking said classification and allocation practices. Different modules interact with one another according to different embodiments; entirety of which are optionally and cooperatively employable.

In one aspect of the present system, a method for allocating unique identification numbers to items and merchandise in a systematic and conceptualized manner is proposed.

In one aspect of the present system, said unique identification number allocation method includes designing at least one artificial neural network with a fully-connected hidden layer.

In a further aspect of the present system, said unique identification number allocation method includes training said artificial neural network with files in the form of training sets and producing models resulting therefrom.

In a further aspect of the present system, said unique identification number allocation method includes forming a significance-based hierarchical sequence of said artificial neural networks i.e. output of one of said neural networks is the input of the next.

In a further aspect of the present system, said unique identification number allocation method includes introducing a preprocessed text vector as input to the first level of said artificial neural network sequence.

In a further aspect of the present system, said unique identification number allocation method includes obtaining a unique identification number to the item/merchandise in question.

In a further aspect of the present system, said unique identification number allocation method includes established communication with at least one external module for accepting raw text input.

In a further aspect of the present system, said unique identification number allocation method includes a preprocessing step to produce input-compatible vectors from a raw text query.

In a further aspect of the present system, said unique identification number allocation method includes lowercasing, where every character in the raw text query is converted to lowercase and recurrent words are eliminated.

In a further aspect of the present system, said unique identification number allocation method includes parsing, where words are parsed and converted to UTF8 format (Unicode Transformation Format—8-bit), punctuation and non-characters are tossed, words are broken down to syllables and morphemes, and arranged in groups of two and three, forming tokens.

In a further aspect of the present system, said unique identification number allocation method includes vector conversion, where tokenized and untokenized instances of data in the previous steps are converted to numeric vectors.

In a further aspect of the present system, said unique identification number allocation method includes normalization, where vector(s) formed thus far are normalized in order to be confined to a specific interval.

In a further aspect of the present system, said unique identification number allocation method includes said artificial neural network training step further comprising one first-level training scheme for categories; one second-level training scheme for chapters; one third-level training scheme for positions; one fourth-level training scheme for subpositions, and; one fifth-level training scheme for identification number(s) as a whole.

In a further aspect of the present system, said unique identification number allocation method includes said first, second, third and fourth-level training schemes for categories, chapters, positions and subpositions respectively comprising divisions of digit pairs, starting from the leftmost and descending in the order of significance.

In a further aspect of the present system, said unique identification number allocation method includes said message verification step authentication of said packet is having been acknowledging only if all steps are positively executed, conversely which it is tossed.

In one aspect of the present system, a system for allocating unique identification numbers to items and merchandise, comprising at least one processing unit and one database is proposed.

In one aspect of the present system, said processing unit includes modules capable of executing parallelized instances of artificial neural networks.

In one aspect of the present system, said processing unit includes manual, web service and FTP input capabilities.

In one aspect of the present system, said database includes lists pertaining to an item catalogue and a list of unique identification numbers associated therewith.

In one aspect of the present system, said database and processing unit include connection with additional modules selected from a group containing; legislative comparison module, similar item comparison module, matching tariffs module.

In one aspect of the present system, said legislative comparison module comprises at least one legislative info pertaining to at least one country other than the user's own.

In one aspect of the present system, said processing unit comprises ERP (enterprise resource planning) compatibility features.

The methods, devices, processing, circuitry, and logic described above may be implemented in many different ways and in many different combinations of hardware and software. For example, all or parts of the processing unit may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or other storage circuitry; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways.

In some examples, each unit, subunit, and/or module of the system, such as the processor unit may include one or more logical components. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method for allocating unique identification numbers to merchandise items, comprising steps of;
    designing a plurality of artificial neural networks each of which includes a fully-connected hidden layer;
    training the plurality of artificial neural networks with files in a form of training sets to produce a plurality of artificial neural network models;
    forming a significance-based hierarchical artificial neural network sequence of the plurality of artificial neural network models organized as: one first-level neural network model for suggesting categories; one second-level neural network model for suggesting chapters; one third-level neural network model for suggesting positions; one fourth-level neural network model for suggesting subpositions, and one fifth-level neural network model for suggesting at least one identification number as a whole, wherein
    an output of the first-level neural network model is used as an input of the second-level neural network model,
    an output of the second-level neural network model is used as an input of the third-level neural network model,
    an output of the third-level neural network model is used as an input of the fourth-level neural network model,
    an output of the fourth-level neural network model is used as an input of the fifth-level neural network model, and
    an identification number suggested by the fifth-level neural network model comprises a category suggested by the first-level neural network model, a chapter suggested by the second-level neural network model, a position suggested by the third-level neural network model, and a subposition suggested by the fourth-level neural network model;
    introducing a preprocessed text vector regarding a merchandise item as input to the first-level neural network model of said artificial neural network sequence, and;
    obtaining a unique identification number prediction to the merchandise item from said artificial neural network sequence.

2. The method of claim 1, further comprising establishing communication with at least one external module for accepting raw text input.

3. The method of claim 1, further comprising a preprocessing step to produce input-compatible vectors from a raw text query.

4. The method of claim 3, characterized in that said preprocessing step comprises further distinct steps of:
    lowercasing, where every character in the raw text query is converted to lowercase and recurrent words are eliminated;
    parsing, where words are parsed and converted to UTF8 format, punctuation and non-characters are removed, the words are broken down to syllables and morphemes, elements are arranged in groups, and tokens are formed;
    vector conversion, where tokenized and untokenized instances of data are converted to numeric vectors, and;
    normalization, where vectors are normalized in order to be confined to a specific interval.

5. The method of claim 1, characterized in that a category suggested by the first-level neural network, a chapter suggested by the second-level neural network, a position suggested by the third-level neural network, and a subposition suggested by the fourth-level neural network respectively represent divisions of digit pairs of an identification number for merchandise item, starting from leftmost digit pair of the identification number and descending in an order of significance.

6. A system for allocating unique identification numbers to merchandise items, comprising at least one processor and one database, characterized in that;

said processor includes modules capable of executing parallelized instances of artificial neural networks, wherein the parallelized instances of artificial neural networks comprises a first-level neural network instance for suggesting categories, a second-level neural network instance for suggesting chapters, a third-level neural network instance for suggesting positions, a fourth-level neural network instance for suggesting subpositions, and a fifth-level neural network instance for suggesting at least one identification number as a whole, an output of the first-level neural network instance is used as an input of the second-level neural network instance, an output of the second-level neural network instance is used as an input of the third-level neural network instance, an output of the third-level neural network instance is used as an input of the fourth-level neural network instance, an output of the fourth-level neural network instance is used as an input of the fifth-level neural network instance, and an identification number suggested by the fifth-level neural network instance comprises a category suggested by the first-level neural network instance, a chapter suggested by the second-level neural network instance, a position suggested by the third-level neural network instance, and a subposition suggested by the fourth-level neural network instance;

said processor includes manual, web service and FTP input capabilities;

said database includes lists pertaining to an item catalogue and a list of unique identification numbers associated with the lists, and;

said database and processor include a connection with at least one of a legislative comparison module, a similar item comparison module, or a matching tariffs module.

7. The system of claim 6, characterized in that said legislative comparison module further comprises at least one legislative info section pertaining to at least one country other than the user's own.

8. The system of claim 6, characterized in that said processor comprises ERP compatibility features.

* * * * *